United States Patent
Mc Donald et al.

(10) Patent No.: US 7,357,019 B2
(45) Date of Patent: Apr. 15, 2008

(54) FAULTY LIFTER OIL MANIFOLD ASSEMBLY SOLENOID DIAGNOSTIC SYSTEM

(75) Inventors: Mike M. Mc Donald, Macomb, MI (US); William C. Albertson, Clinton Township, MI (US); Cheryl A. Williams, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 311 days.

(21) Appl. No.: 11/290,005

(22) Filed: Nov. 30, 2005

(65) Prior Publication Data

US 2007/0119406 A1    May 31, 2007

(51) Int. Cl.
*G01M 15/04* (2006.01)
*G01M 17/00* (2006.01)
*F02D 13/06* (2006.01)
*F02D 17/02* (2006.01)

(52) U.S. Cl. ............ 73/117.3; 123/198 F; 123/90.1; 701/29

(58) Field of Classification Search .... 73/117.2–117.3; 123/198 F, 90.1, 90.48–90; 701/29
See application file for complete search history.

(56) References Cited

U.S. PATENT DOCUMENTS 6,307,376 B1 * 10/2001 Alexander et al. .......... 324/388
6,752,121 B2    6/2004 Rayl et al.
7,302,921 B2 * 12/2007 McDonald et al. ....... 123/90.12

* cited by examiner

*Primary Examiner*—Stephen K. Cronin
*Assistant Examiner*—Ka Chun Leung

(57) ABSTRACT

A diagnostic system that detects a faulty lifter oil manifold assembly solenoid includes a current measurement module, a time delay module, a voltage measurement module, and a diagnostic module. The current measurement module measures current flowing through the solenoid when a trigger signal is enabled. The time delay module determines a time delay based on the measured current. The voltage measurement module measures a supply voltage that powers the solenoid. The diagnostic module determines whether the solenoid is faulty based on the time delay and supply voltage.

19 Claims, 9 Drawing Sheets

FAULTY LIFTER OIL MANIFOLD ASSEMBLY SOLENOID DIAGNOSTIC SYSTEM

FIELD OF THE INVENTION

The present invention relates to displacement on demand internal combustion engines and more specifically to detecting a faulty solenoid that deactivates cylinders of the internal combustion engine.

BACKGROUND OF THE INVENTION

An increased demand for more fuel efficient engines without compromising performance has led to the development of displacement on demand (DoD) internal combustion engines. DoD engines include a control system that deactivates cylinders under low load conditions and reactivates cylinders under high load conditions. For example, an eight cylinder engine can operate using four cylinders to improve fuel economy by reducing pumping losses but can use all eight cylinders when more power is required such as during acceleration. A DoD engine is in an activated mode when using all of the cylinders and a deactivated mode when using less than all of the cylinders.

In the deactivated mode, there are less cylinders operating. As a result, there is less drive torque available to drive the vehicle driveline and accessories (e.g., alternator, coolant pump, A/C compressor). Engine efficiency, however, is increased as a result of decreased fuel consumption (i.e., no fuel supplied to the deactivated cylinders) and decreased engine pumping. Because the deactivated cylinders do not take in fresh intake air, pumping losses are reduced.

A lifter oil manifold assembly (LOMA) is implemented to activate and deactivate select cylinders of the engine. The LOMA includes a series of solenoids associated with corresponding cylinders. The solenoids are selectively energized to enable hydraulic fluid flow to switchable lifters to inhibit valve operation, thereby deactivating the corresponding cylinders. In the event of a solenoid failure, mechanical damage may occur to the engine. Therefore, it is advantageous to detect a faulty solenoid quickly to prevent possible engine damage.

One method to detect a faulty solenoid is to monitor for an electrical short or an open circuit. However, this method will only detect an electrical failure of the solenoid without regard to a mechanical failure such as a stuck solenoid.

SUMMARY OF THE INVENTION

A diagnostic system that detects a faulty lifter oil manifold assembly solenoid according to the present invention includes a current measurement module, a time delay module, a voltage measurement module, and a diagnostic module. The current measurement module measures current flowing through the solenoid when a trigger signal is enabled. The time delay module determines a time delay based on the measured current. The voltage measurement module measures a supply voltage that powers the solenoid. The diagnostic module determines whether the solenoid is faulty based on the time delay and supply voltage.

In other features, the time delay is based on a transition of a slope of the measured current. The time delay is a period of time between the transition of the slope and when the trigger signal is enabled. The diagnostic module determines that the solenoid is faulty when the time delay is greater than an upper time threshold or lower than a lower time threshold. The upper and lower time thresholds are based on the supply voltage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
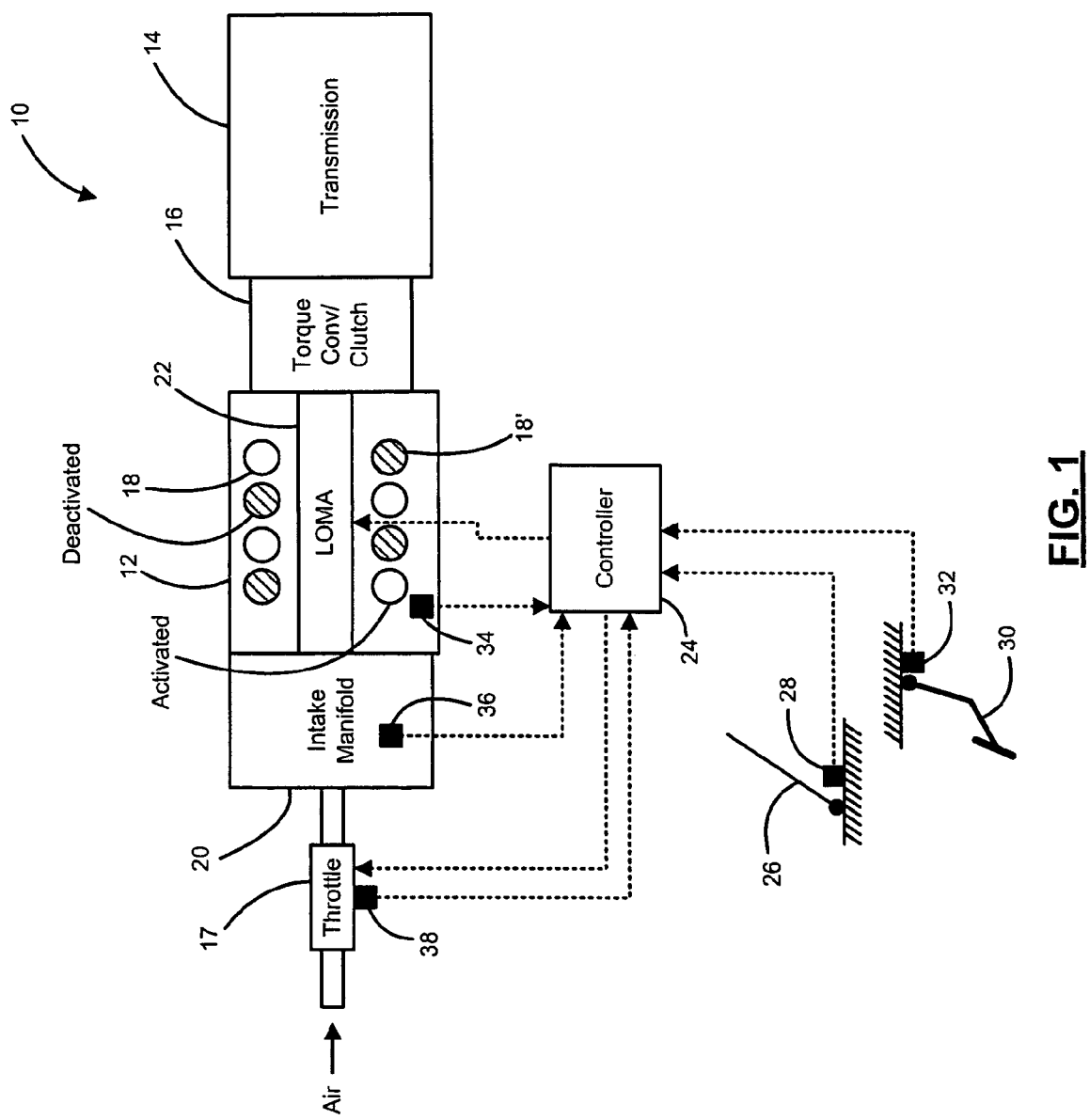
FIG. 1 is a functional block diagram illustrating a vehicle powertrain including a displacement on demand (DoD) engine.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 17. The engine 12 includes N cylinders 18. One or more select cylinders 18' are selectively deactivated during engine operation. Although FIG. 1 depicts eight cylinders (N=8), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine also includes a lifter oil manifold assembly (LOMA) 22 that deactivates the select cylinders 18', as described in further detail below.

A controller 24 communicates with the engine 12 and various inputs and sensors as discussed herein. A vehicle operator manipulates an accelerator pedal 26 to regulate the throttle 17. More particularly, a pedal position sensor 28 generates a pedal position signal that is communicated to the controller 24. The controller 24 generates a throttle control signal based on the pedal position signal. A throttle actuator (not shown) adjusts the throttle 17 based on the throttle control signal to regulate air flow into the engine 12.

The vehicle operator manipulates a brake pedal 30 to regulate vehicle braking. More particularly, a brake position sensor 32 generates a brake pedal position signal that is communicated to the controller 24. The controller 24 generates a brake control signal based on the brake pedal position signal. A brake system (not shown) adjusts vehicle braking based on the brake control signal to regulate vehicle speed. An engine speed sensor 34 generates a signal based on engine speed. An intake manifold absolute pressure (MAP) sensor 36 generates a signal based on a pressure of the intake manifold 20. A throttle position sensor (TPS) 38 generates a signal based on throttle position.

When the engine 12 enters an operating point to enable the deactivated mode, the controller 24 transitions the engine 12 to the deactivated mode. In an exemplary embodiment, N/2 cylinders 18 are deactivated, although one or more cylinders may be deactivated. Upon deactivation of the select cylinders 18', the controller 24 increases the power output of the remaining or activated cylinders 18. The inlet and exhaust ports (not shown) of the deactivated cylinders 18' are closed to reduce pumping losses.

The engine load is determined based on the intake MAP, cylinder mode, and engine speed. More particularly, if the MAP is below a threshold level for a given RPM, the engine load is deemed light and the engine 12 could possibly be operated in the deactivated mode. If the MAP is above the threshold level for the given RPM, the engine load is deemed heavy and the engine 12 is operated in the activated mode. The controller 24 controls the LOMA 22 based on the solenoid control, as discussed in further detail below.

Figure 2:
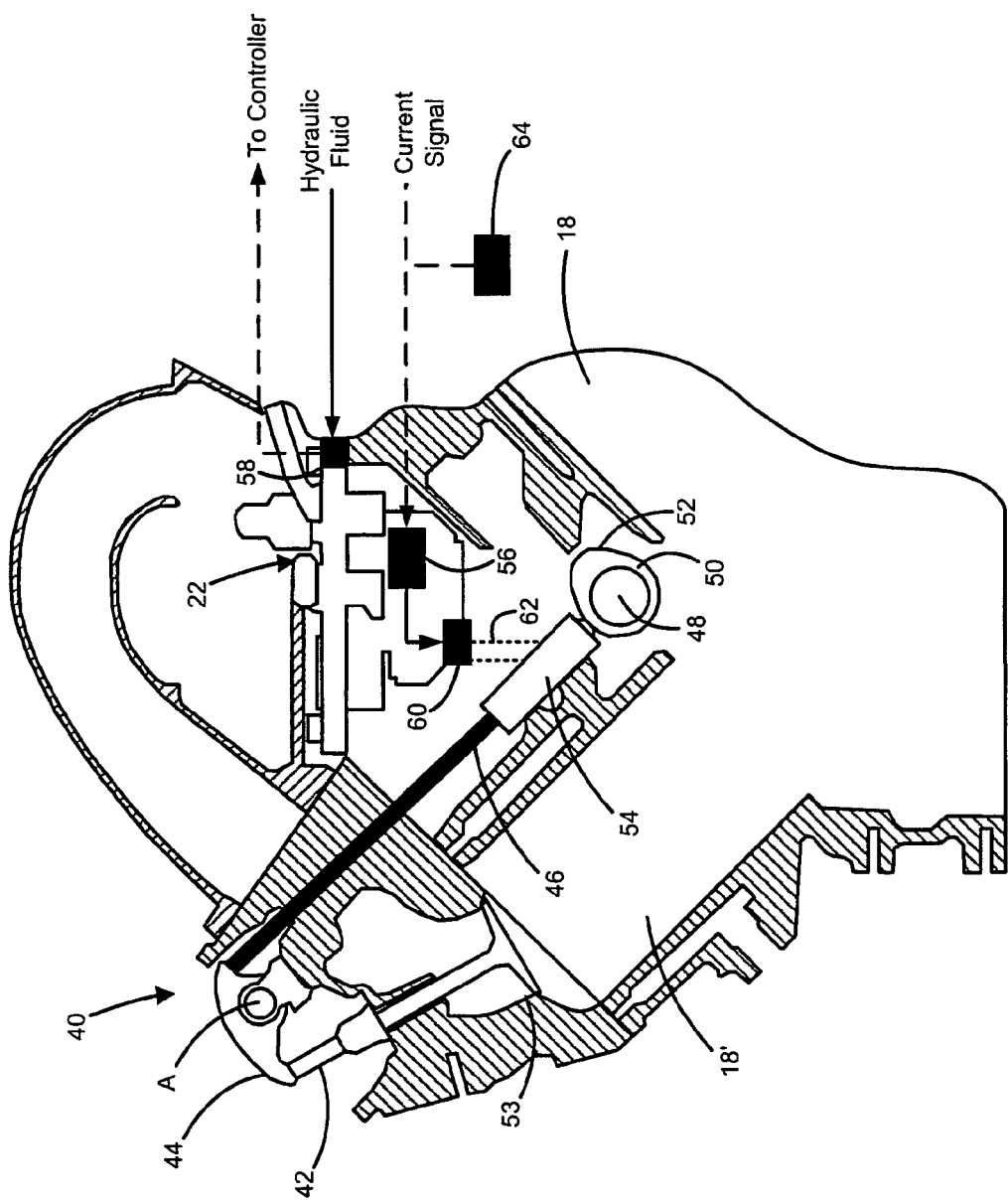
FIG. 2 is a partial cross-sectional view of the DoD engine illustrating a lifter oil manifold assembly (LOMA) and an intake valvetrain.

Referring now to FIG. 2, an intake valvetrain 40 of the engine 12 includes an intake valve 42, a rocker 44 and a pushrod 46 associated with each cylinder 18. The engine 12 includes a rotatably driven camshaft 48 having a plurality of valve cams 50 disposed therealong. A cam surface 52 of the valve cams 50 engage lifters, discussed in detail below, and the pushrods 46 to cyclically open and close intake ports 53 within which the intake valves 42 are positioned. The intake valve 42 is biased to a closed position by a biasing member (not illustrated) such as a spring. As a result, the biasing force is transferred through the rocker 44 to the pushrod 46, causing the pushrod 46 to press against the cam surface 52.

As the camshaft 48 is caused to rotate, the valve cam 50 induces linear motion of the corresponding pushrod 46. As the pushrod 46 is induced to move outward, the rocker 44 is caused to pivot about an axis (A). Pivoting of the rocker 44 induces movement of the intake valve 42 toward an open position, thereby opening the intake port 53. The biasing force induces the intake valve 42 to the closed position as the camshaft 48 continues to rotate. In this manner, the intake port 53 is cyclically opened to enable air intake.

Although the intake valvetrain 40 of the engine 12 is illustrated in FIG. 2, it is appreciated that the engine 12 also includes an exhaust valvetrain (not shown) that operates in a similar manner. More specifically, the exhaust valvetrain includes an exhaust valve, a rocker and a pushrod associated with each cylinder 18. Rotation of the camshaft 48 induces reciprocal motion of the exhaust valves to open and close associated exhaust ports, as similarly described above for the intake valvetrain.

The LOMA 22 provides pressurized fluid to a plurality of lifters 54 and includes solenoids 56 (shown schematically) associated with select cylinders 18' (see FIG. 1). The select cylinders 18' are those that are deactivated when operating the engine 12 in the deactivated mode. The lifters 54 are disposed within the intake and exhaust valvetrains to provide an interface between the cams 50 and the pushrods 46. More specifically, the lifters 54 selectively induce linear motion in the corresponding pushrods 46. In general, there are two lifters 54 provided for each select cylinder 18' (one lifter for the intake valve 42 and one lifter for the exhaust valve). It is anticipated, however, that more lifters 54 can be associated with each select cylinder 18' (i.e., multiple inlet or exhaust valves per cylinder 18'). The LOMA 22 further requires a pressure sensor 58 that generates a pressure signal indicating a pressure of a hydraulic fluid supply to the LOMA 22. It is anticipated that one or more pressure sensors 58 can be implemented.

Each lifter 54 associated with the select cylinders 18' is hydraulically actuated between first and second modes. The first and second modes respectively correspond to the activated and deactivated modes. In the first mode, the lifter 54 provides a mechanical connection between the cam 50 and the pushrod 46. In this manner, the cam 50 induces linear motion of the lifter 54, which is transferred to the pushrod 46. In the second mode, the lifter 54 functions as a buffer to provide a mechanical disconnect between the cam 50 and the pushrod 46. Although the cam 50 induces linear motion of the lifter 54, the linear motion is not transferred to the pushrod 46. A more detailed description of the lifters 54 is presently foregone as lifters and their operation are known to those of skill in the art.

The solenoids 56 selectively enable hydraulic fluid flow to the lifters 54 to switch the lifters 54 between the first and second modes. Although there is generally one solenoid 56 associated with each select cylinder 18' (i.e., one solenoid for two lifters), it is anticipated that more or fewer solenoids 56 can be implemented. Each solenoid 56 actuates an associated valve 60 (shown schematically) between open and closed positions. In the closed position, the valve 60 inhibits pressurized hydraulic fluid flow to the corresponding lifters 54. In the open position, the valve 60 enables pressurized fluid flow to the corresponding lifters 54 via a fluid passage 62. The pressurized hydraulic fluid flow is provided to the LOMA 22 from a pressurized hydraulic fluid source.

Although not illustrated, a brief description of an exemplary solenoid is provided herein to provide a better understanding of the present invention. The solenoids 56 generally include an electromagnetic coil and an armature that is disposed coaxially within the coil. The armature provides a mechanical interface between the solenoid 56 and a mechanical element, such as the valve 60. The armature is biased to a first position relative to the coil by a biasing force. The biasing force can be imparted by a biasing member, such as a spring, or by a pressurized fluid. The solenoid 56 is energized by supplying current to the coil, which induces magnetic force along the coil axis. The magnetic force induces linear movement of the armature to a second position. In the first position, the armature holds the valve 60 in its closed position to inhibit pressurized hydraulic fluid flow to the corresponding lifters. In the second position, the armature actuates the valve 60 to its open position to enable pressurized hydraulic fluid flow to the corresponding lifters.

A faulty solenoid detection system 64 monitors voltage supplied to the solenoid 56 and current drawn by the solenoid 56. Using these two parameters, the faulty solenoid detection system 64 determines whether the solenoid 56 is responding properly. If the solenoid 56 is not responding properly, the faulty solenoid detection system 64 reports a fault.

Figure 3:
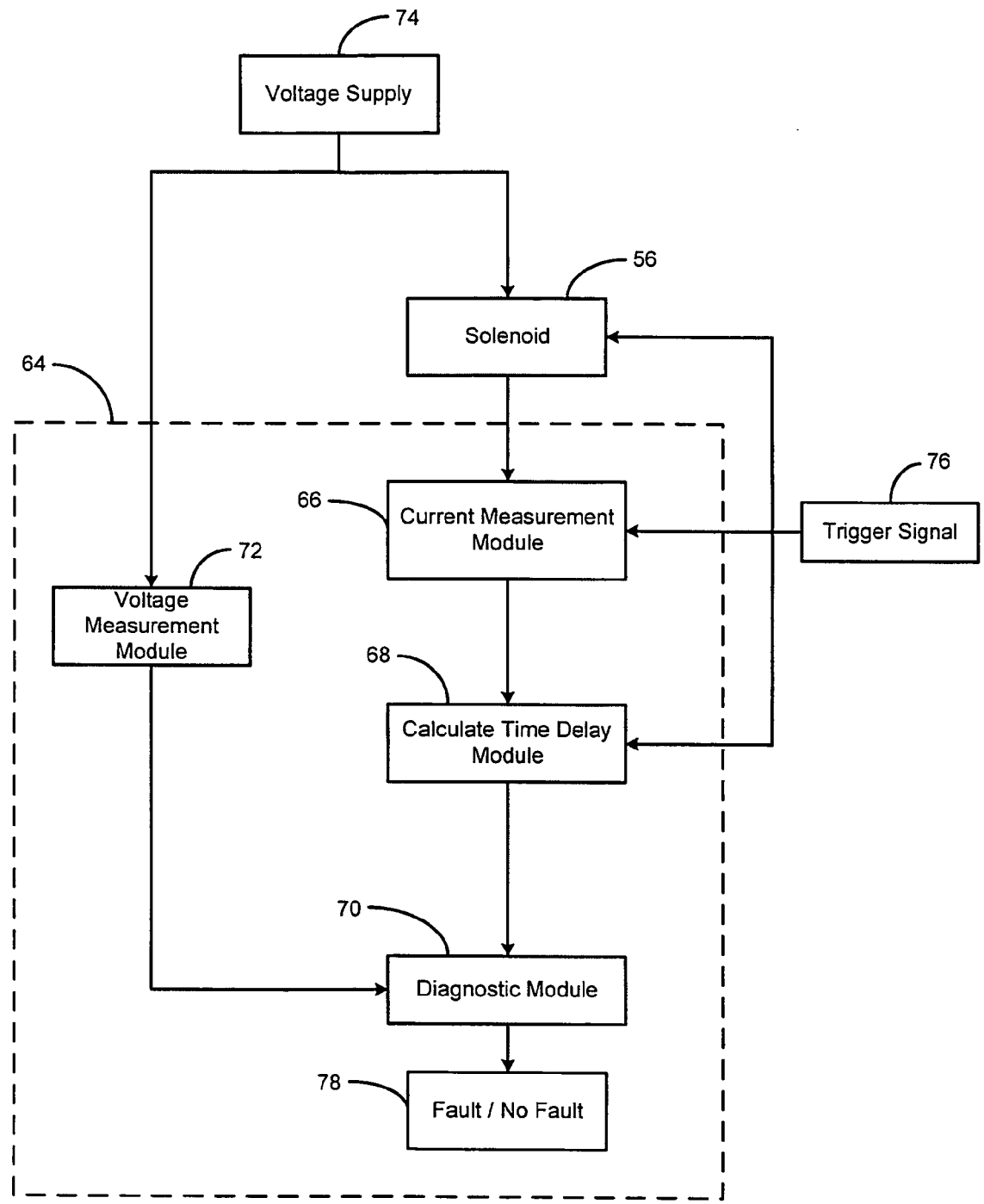
FIG. 3 is a functional block diagram of a faulty solenoid detection system according to the present invention.

Referring now to FIG. 3, the faulty solenoid detection system 64 includes a current measurement module 66, a calculate time delay module 68, a diagnostic module 70, and a voltage measurement module 72. A voltage supply 74 supplies power to the solenoid 56 when a trigger signal 76 is enabled. The current measurement module 66 measures the flow of current through the solenoid 56 when the trigger signal 76 has been enabled. The calculate time delay module 68 calculates how much time has elapsed between the enablement of the trigger signal 76 and the fully advanced movement of the solenoid 56. The calculate time delay module 68 uses current measurements from the current measurement module 66 to determine when the solenoid 56 is fully advanced. The diagnostic module 70 uses the time delay calculation from the calculate time delay module 68 and a voltage measurement from the voltage measurement module 72 to determine whether the solenoid has a fault 78.

Figure 4:
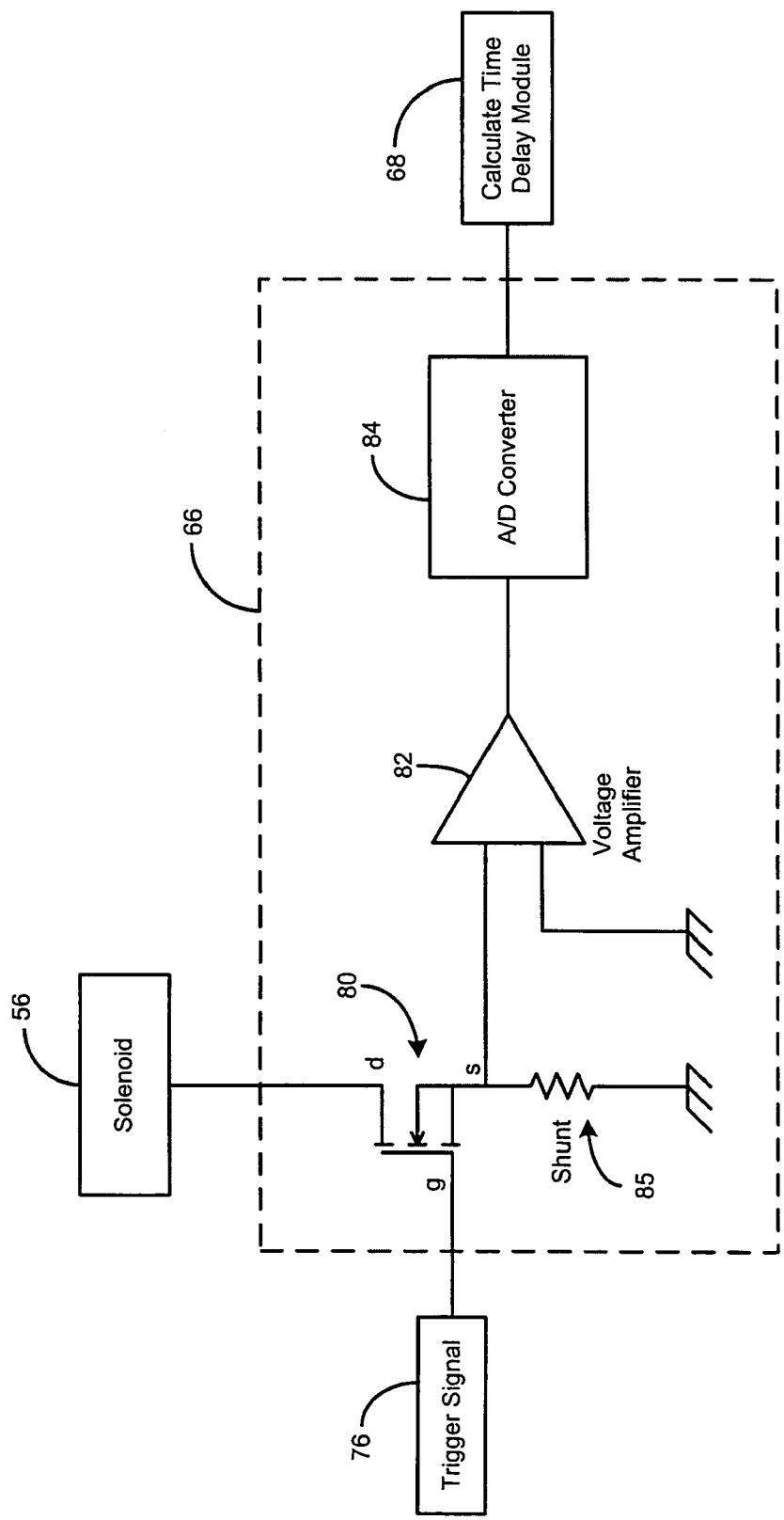
FIG. 4 is an exemplary schematic of a current measurement module according to the present invention.

Referring now to FIG. 4, an exemplary embodiment of the current measurement module 66 incorporating a low side current measurement scheme includes a transistor 80, a voltage amplifier 82, and an analog to digital (A/D) converter 84. The transistor 80 is a n-channel metal-oxide semiconductor field-effect transistor (NMOS) and acts as a switch that allows current to flow when the trigger signal 76 is enabled. Although the transistor 80 is shown as an NMOS transistor, any switching method enabled by the trigger signal 76 may be used in accordance with the present invention.

When the transistor 80 is enabled, a voltage drop is created across a shunt resistor 85 that is connected to the source of the transistor 80 and ground. The voltage drop across the shunt resistor 85 is a representation of current flowing through the solenoid 56.

The voltage amplifier 82 is connected to the source of the transistor 80 and ground. The voltage amplifier 82 is used to scale the voltage drop across the shunt resistor 85 to a level required by an input of the A/D converter 84.

The input of the A/D converter 84 is connected to the output of the voltage amplifier 82. The A/D converter 84 receives an analog signal from the voltage amplifier 82 and converts it to a digital signal. The digital signal is additionally scaled by the A/D converter 84 to correspond to the measured current of the solenoid 56. In a preferred embodiment, the A/D converter samples the output of the voltage amplifier at a rate of 5000 samples per second. The output of the A/D converter 84 is connected to the calculate time delay module 68 allowing for the use of the digital signal in calculating the time delay of the solenoid 56.

Figure 5:
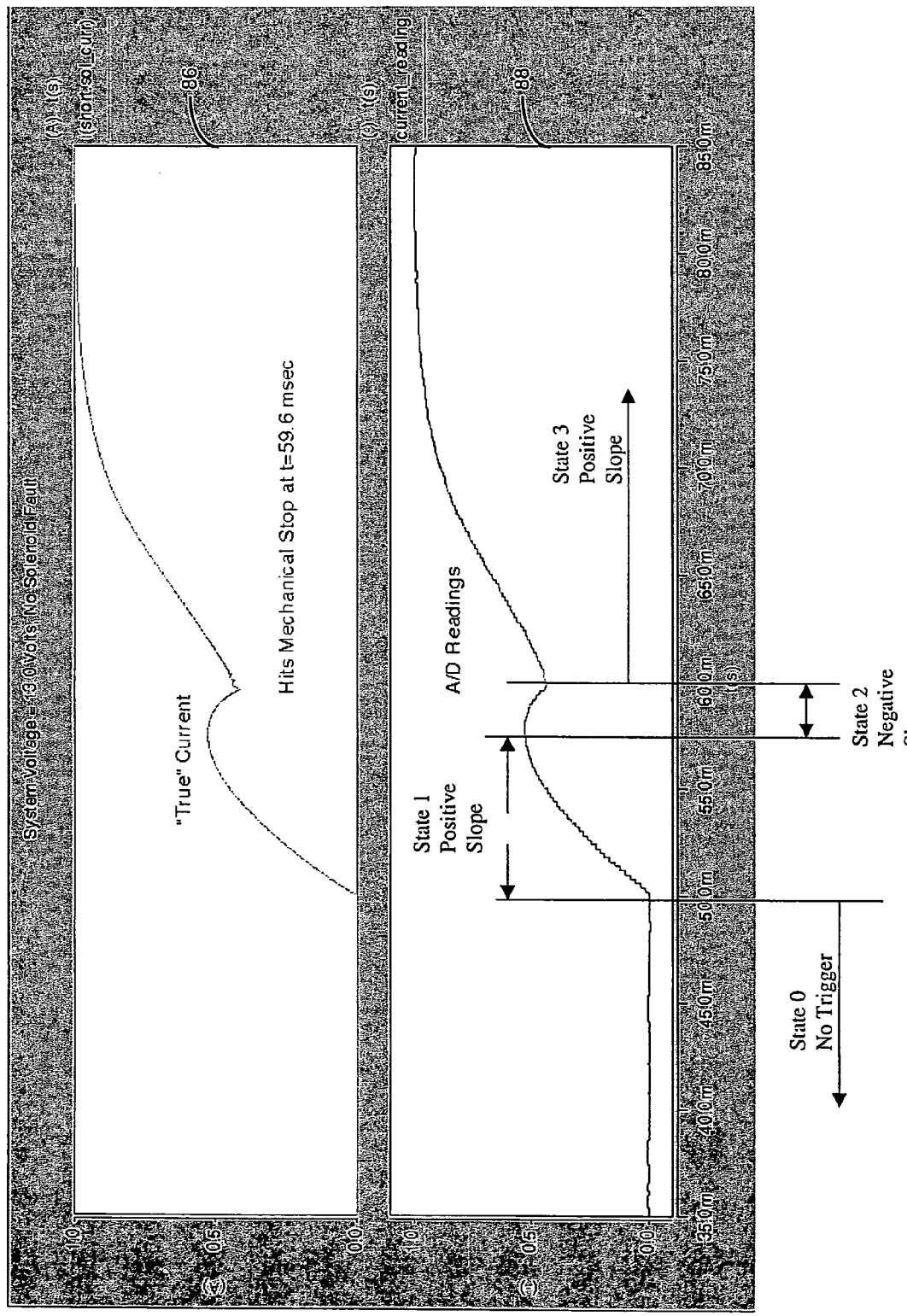
FIG. 5 is a graphical representation of current flowing through a LOMA solenoid versus time.

FIG. 5 is a graphical representation of current flowing through the solenoid 56. The top graph 86 corresponds to the actual current flowing through the solenoid 56. The bottom graph 88 corresponds to the digital current readings from the current measurement module 66. In both graphs 86 and 88, the trigger signal 76 occurs at approximately 50 ms and a "valley" exists at approximately 60 ms. The "valley" in the current readings corresponds to the armature of the solenoid 56 hitting a mechanical stop. The time delay is the difference in time between the trigger signal 76 and the "valley" of the current readings.

In the bottom graph 88, state 0 describes the state of the solenoid 56 before the trigger signal 76 is commanded, state 1 describes the state of increasing solenoid current, state 2 describes decreasing solenoid current, and state 3 describes increasing solenoid current after the armature of the solenoid 56 has hit the mechanical stop. The time delay is the time elapsed between the state 0 to state 1 transition and the state 2 to state 3 transition.

The time of the state 0 to state 1 transition is the time that the trigger signal 76 is activated. However, the time for the remaining transitions is calculated by inspection of the current signal. In state 1, the current signal increases and has a positive slope. In state 2, the current signal decreases and has a negative slope. The state 1 to state 2 transition is when the current slope changes from positive to negative. Since state 3 has an increasing slope, the state 2 to state 3 transition is determined by the time at which the current slope changes from negative to positive.

As is commonly known, the derivative of a function represents the slope of the function. In a discrete domain, an adequate approximation of the derivative of the current signal can be calculated in order to determine the slope. Several numerical methods may be employed to achieve this objective. The simplest is a two-point backward difference approximation of the derivative. The two-point backward difference approximation uses the following equation:

$$y' = \frac{y_n - y_{n-1}}{h}$$

where y' is the approximate derivative of the current signal, $y_n$ is the present sample of the current signal, $y_{n-1}$ is the previous sample of the current signal, and h is the time between samples of the current signal. In a preferred embodiment, the time between samples, h, is equivalent to the sampling rate of the A/D converter 84.

The two-point backward difference approximation of the derivative may be sensitive to signal noise. Approximations with a smaller degree of error can be calculated, but they generally use additional samples to achieve accuracy or use non-realtime processing. Therefore, it is preferable to calculate the derivative of a moving average of the current signal rather than the current signal directly. Although the moving average of the samples will help smooth out noise, it is still possible for slight increases and decreases in the derivative of the slope to prematurely indicate that the current signal has changed direction. Thus, it is preferable for a change in slope to persist for several consecutive samples before it is reported. If the state 2 to state 3 transition is not detected within a predetermined period, the calculate time delay module 68 reports a maximum time (e.g., 50 ms) as the time delay of the solenoid 56.

Figure 6:
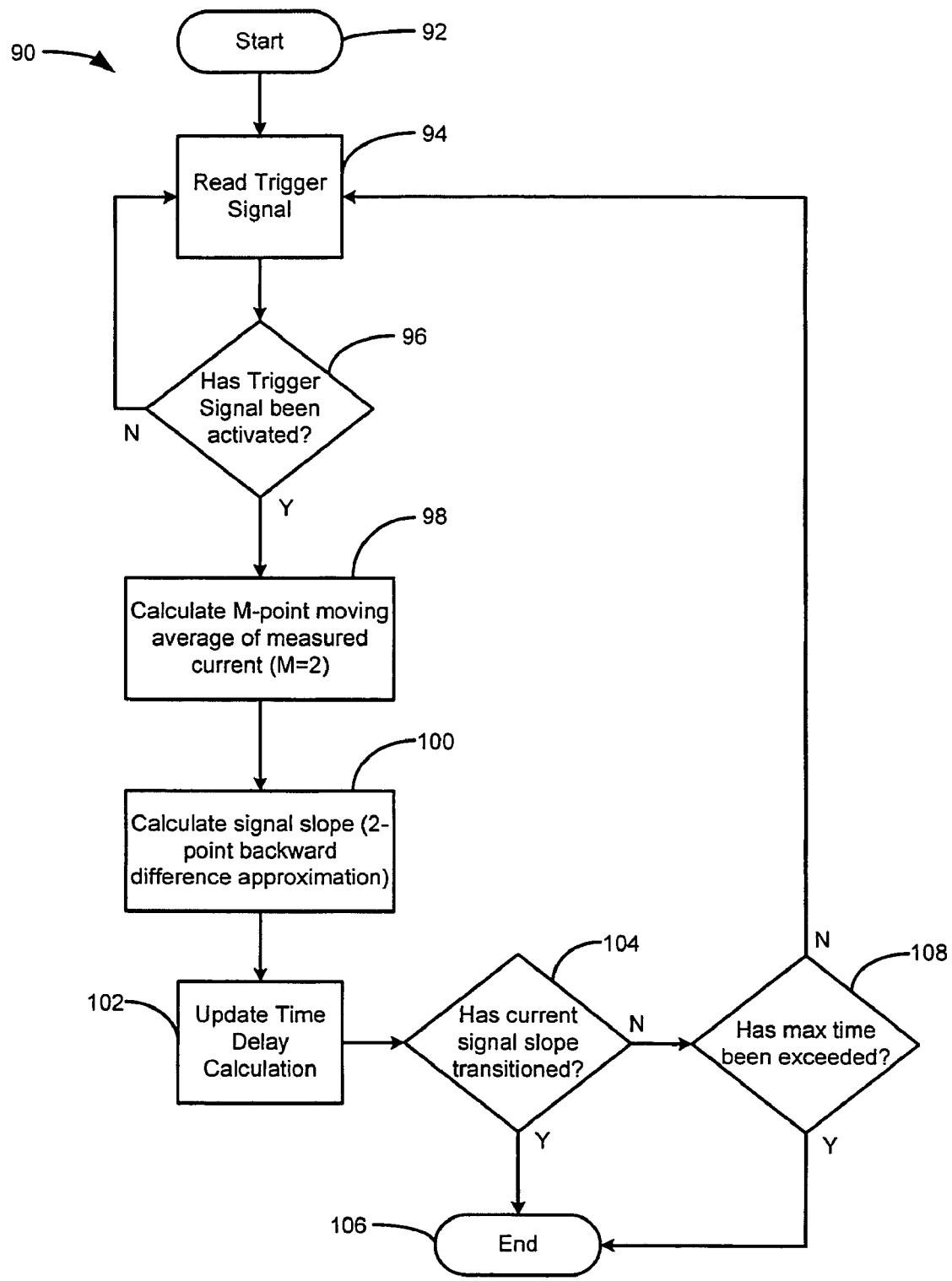
FIG. 6 is a flowchart illustrating steps taken by a calculate time delay module according to the present invention.

Referring now to FIG. 6, the calculate time delay module 68 implements the steps generally shown at 90. Control begins at step 92. The calculate time delay module 68 detects the trigger signal 76 in step 94 and determines whether the trigger signal 76 has been activated in step 96. If the trigger signal 76 has not been activated control returns to step 94. However, if the trigger signal 76 has been activated the calculate time delay module 68 executes step 98 to calculate the moving average of the current signal. In step 100, the calculate time delay module 68 approximates the derivative of the current signal with the backward difference approximation of the moving average of the current signal. In step 102, the calculate time delay module 68 updates the time delay calculation. In step 104, the calculate time delay module determines whether the slope of the current signal has transitioned from negative to positive. If the slope has transitioned, control ends in step 106. If the slope has not transitioned, the calculate time delay module 68 determines whether the maximum time has been exceeded to find the transition of the slope of the current signal in step 108. If the maximum time has been exceeded, control ends in step 106. If the maximum time has not been exceeded, control returns to step 94 for another iteration.

Figure 7:
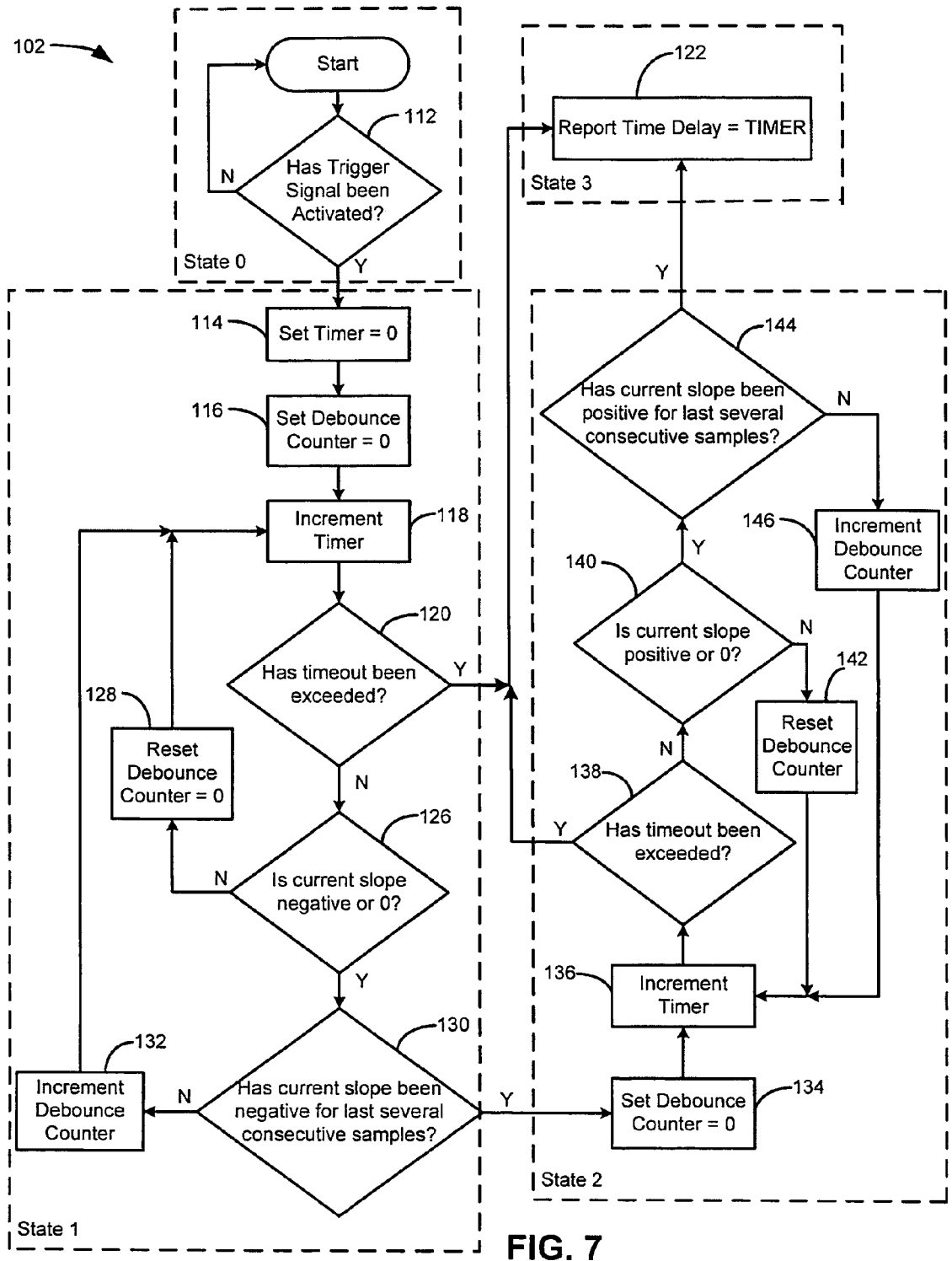
FIG. 7 is a flowchart illustrating steps taken by the calculate time delay module to update a time delay calculation according to the present invention.

Referring now to FIG. 7, the update time delay calculation in step 102 is implemented by a state machine. The state machine begins in state 0 when the vehicle 10 is started. While in state 0, control determines whether the trigger signal 76 has been activated in step 112. If the trigger signal 76 has not been activated, control remains in state 0.

If the trigger signal 76 has been activated, control enters state 1 and sets a timer to zero in step 114. In step 116, control sets a debounce counter to zero. The debounce counter is used to ensure that a change in current slope persists for several consecutive samples. The timer is incremented in step 118. In step 120, control determines whether the maximum time has been exceeded to locate the transition from negative to positive of the current slope. If the maximum time has been exceeded, control enters state 3 and reports the maximum time as the time delay in step 122. If the maximum time has not been exceeded, control remains in state 1 and determines whether the current slope is negative or zero in step 126. If the current slope is not negative or zero, control resets the debounce counter to zero in step 128 and returns to step 118. If the current slope is negative or zero control determines whether the slope has been negative for the last several consecutive samples in step 130. If the slope has not been negative for the last several consecutive samples, control remains in state 1, increments the debounce counter in step 132, and returns to step 118.

If the slope has been negative for the last several consecutive samples, control enters state 2 and sets the debounce counter to zero in step 134. In step 136, control increments the timer. In step 138, control determines whether the maximum time has been exceeded to find the transition of the slope of the current signal from negative to positive. If the maximum time has been exceeded, control enters state 3 and reports the maximum time as the time delay in step 122. If the maximum time has not been exceeded, control remains in state 2 and determines whether the slope of the current signal is positive or zero in step 140. If the slope is not positive or zero, control resets the debounce counter in step 142 and returns to step 136. If the slope is positive or zero, control determines whether the slope has been positive for the past several samples in step 144. If the slope of the current signal has not been positive for the last several consecutive samples, control remains is state 2, increments the debounce counter in step 146, and returns to step 136. If the slope has been positive for the last several consecutive samples, control enters state 3 and reports the time delay in step 122.

Figure 8:
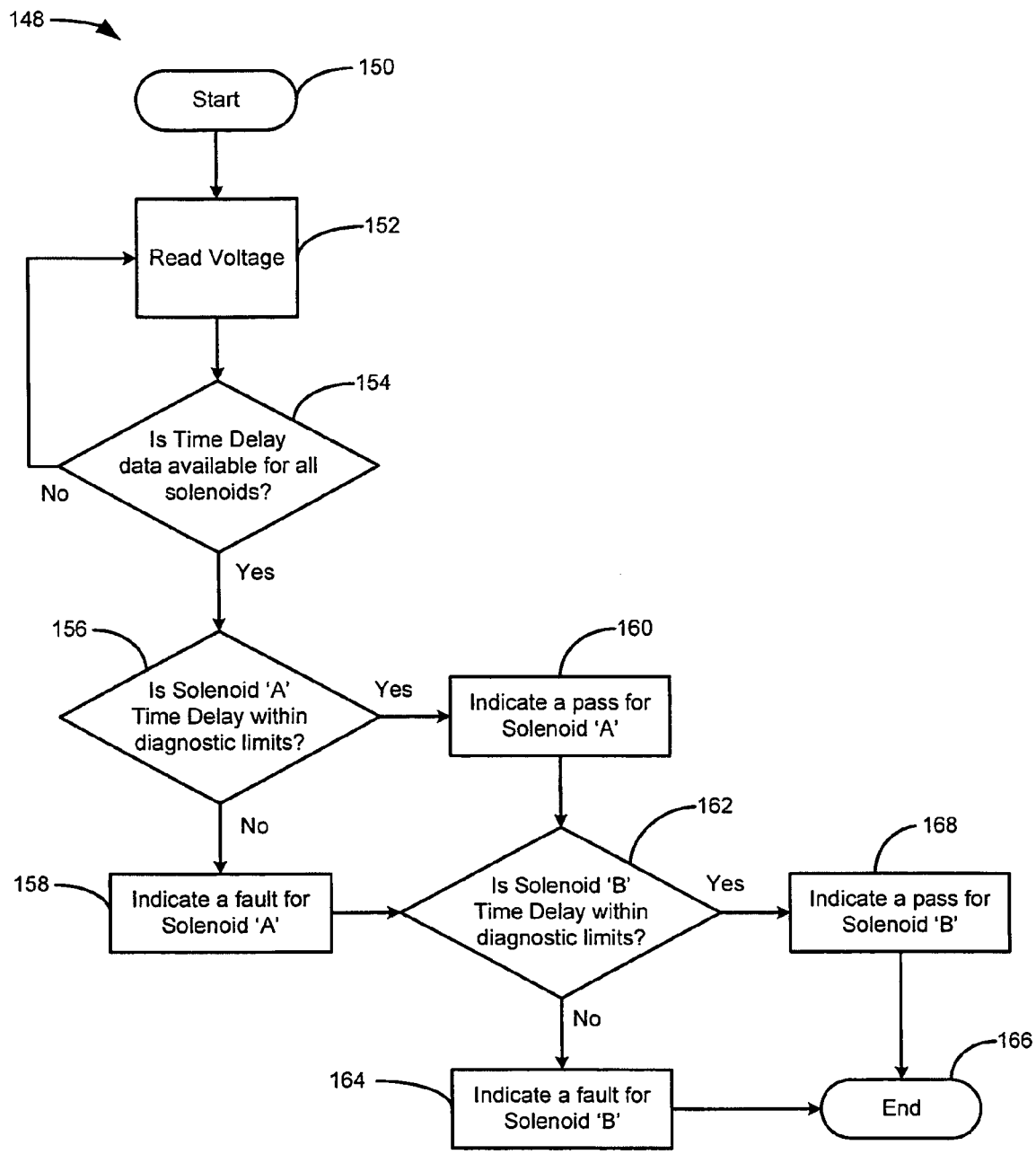
FIG. 8 is a flowchart illustrating steps taken by a diagnostic module according to the present invention.

Referring now to FIG. 8, the diagnostic module 70 implements the steps generally shown at 148. The process only shows control for two solenoids 56, but the process can be implemented for any number of solenoids 56. Control begins in step 150. The diagnostic module 70 reads a voltage from the voltage measurement module 72 in step 152 and determines whether time delay data is available for all solenoids 56 in step 154. If time delay data is not available, control returns to step 152. If time delay data is available, step 156 determines whether time delay of the first solenoid is within an upper and lower time threshold. If the time delay is not within the upper and lower time threshold, control indicates a fault for the first solenoid in step 158. If the time delay is within the upper and lower time threshold, control indicates a pass for the first solenoid in step 160. In step 162, control determines whether the time delay of a second solenoid is within the upper and lower time threshold. If the time delay is not within the upper and lower time threshold, control indicates a fault for the second solenoid in step 164 and control ends in step 166. If the time delay is within the upper and lower threshold, control indicates a pass for the second solenoid in step 168 and control ends in step 166.

Figure 9:
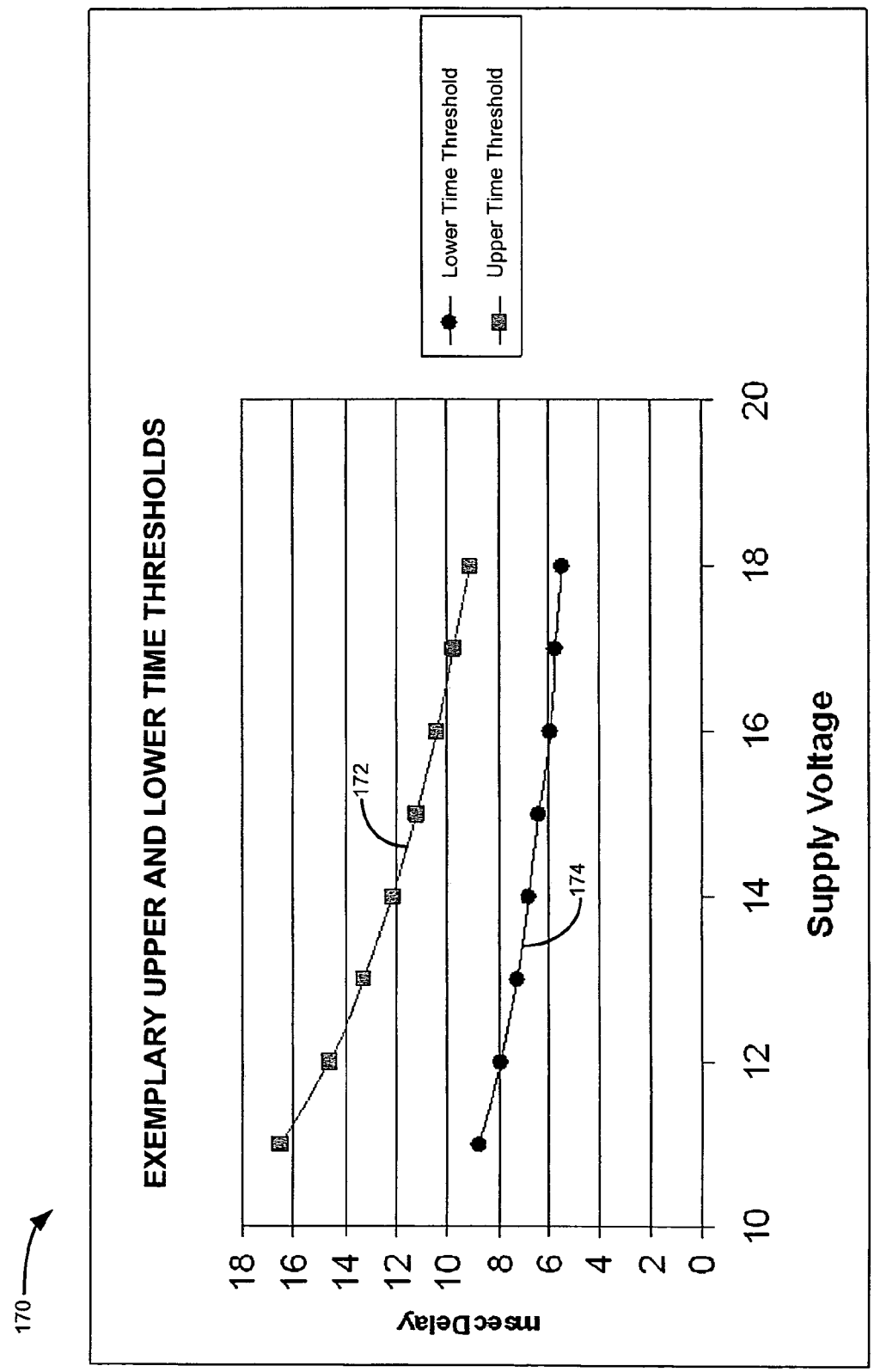
FIG. 9 is a graphical representation of exemplary upper and lower time thresholds with respect to a voltage supplied to the LOMA solenoid.

Referring now to FIG. 9, the graph 170 shows exemplary upper and lower thresholds with respect to voltage supplied to the solenoid 56. The diagnostic module 70 uses the time delay calculated from the calculate time delay module 68 and the voltage output of the voltage reading module 72 to determine if the solenoid 56 has a fault. More specifically, the time delay of the solenoid 56 must be greater than the upper threshold 172 or less than the lower threshold 174 for the respective voltage supplied to the solenoid 56 to register a fault.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A diagnostic system that detects a faulty lifter oil manifold assembly solenoid, comprising:
    a current measurement module that measures current flowing through the solenoid when a trigger signal is enabled;
    a time delay module that determines a time delay based on said measured current;
    a voltage measurement module that measures a supply voltage that powers the solenoid; and
    a diagnostic module that determines whether the solenoid is faulty based on said time delay and said supply voltage.

2. The diagnostic system of claim 1 wherein said time delay is based on a transition of a slope of said measured current.

3. The diagnostic system of claim 2 wherein said time delay is a period of time between said transition of said slope and when said trigger signal is enabled.

4. The diagnostic system of claim 3 wherein said time delay module calculates a derivative of said measured current.

5. The diagnostic system of claim 4 wherein said time delay module determines said time delay based on said trigger signal and said derivative.

6. The diagnostic system of claim 5 wherein said time delay module starts timing said time delay when said trigger signal is enabled and stops timing said time delay when said derivative transitions from negative to positive.

7. The diagnostic system of claim 1 wherein said diagnostic module determines that the solenoid is faulty when said time delay is greater than an upper time threshold.

8. The diagnostic system of claim 7 wherein said diagnostic module determines that the solenoid is faulty when said time delay is less than a lower time threshold.

9. The diagnostic system of claim 8 wherein said upper time threshold and said lower time threshold are based on said supply voltage.

10. The diagnostic system of claim 1 wherein said current measurement module comprises:
   a switch that is in communication with the solenoid and that is enabled with said trigger signal;
   a shunt resistor that is in communication with said switch and ground wherein current flows through said shunt resistor when said switch is enabled;
   an analog to digital converter that converts said measured current into a digital current; and
   an amplifier that scales a voltage drop across said shunt resistor to a level required by said analog to digital converter.

11. A method to detect a faulty lifter oil manifold assembly solenoid, comprising:
   measuring current flowing through the solenoid when a trigger signal is enabled;
   determining a time delay based on said measured current;
   measuring a supply voltage that powers the solenoid; and
   determining whether the solenoid is faulty based on said time delay and said supply voltage.

12. The method of claim 11 wherein said time delay is based on a transition of a slope of said measured current.

13. The method of claim 12 wherein said time delay is a period of time between said transition of said slope and when said trigger signal is enabled.

14. The method of claim 13 further comprising calculating a derivative of said measured current.

15. The method of claim 14 further comprising determining said time delay based on said trigger signal and said derivative.

16. The method of claim 15 further comprising timing said time delay when said trigger signal is enabled until said derivative transitions from negative to positive.

17. The method of claim 11 further comprising determining that the solenoid is faulty when said time delay is greater than an upper time threshold.

18. The method of claim 17 further comprising determining that the solenoid is faulty when said time delay is less than a lower time threshold.

19. The method of claim 18 wherein said upper time threshold and said lower time threshold are based on said supply voltage.

* * * * *